(12) United States Patent
Wakabayashi (10) Patent No.: US 7,314,288 B2
(45) Date of Patent: Jan. 1, 2008

(54) BACKLIGHT SYSTEM

(75) Inventor: Toshitsugu Wakabayashi, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 10/747,192

(22) Filed: Dec. 30, 2003

(65) Prior Publication Data

US 2004/0257793 A1    Dec. 23, 2004

(30) Foreign Application Priority Data

Jun. 18, 2003    (JP)    ............................. 2003-173445

(51) Int. Cl.
F21S 4/00    (2006.01)
(52) U.S. Cl. .................... 362/225; 362/97; 362/260
(58) Field of Classification Search ............ 362/29–30, 362/260, 558–561, 219, 221–222, 225, 97, 362/217, 224, 255–256; 313/489, 634–635, 313/112, 326, 479, 580; 349/260, 58, 61, 349/70–71, 64–65; 345/102
See application file for complete search history.

(56) References Cited

U.S. PATENT DOCUMENTS

| | | | | |
|---|---|---|---|---|
| 2,135,480 | A * | 11/1938 | Birdseye ..................... | 313/113 |
| 4,391,847 | A * | 7/1983 | Brown ........................ | 427/106 |
| 4,432,044 | A * | 2/1984 | Lautzenheiser ............. | 362/223 |
| 4,748,546 | A * | 5/1988 | Ukrainsky .................. | 362/223 |
| 4,803,399 | A * | 2/1989 | Ogawa et al. .............. | 313/493 |
| 4,943,689 | A * | 7/1990 | Siefer et al. ............. | 178/18.11 |
| 5,038,259 | A * | 8/1991 | Katoh et al. ................ | 362/256 |
| 5,101,330 | A * | 3/1992 | Suzuki ........................ | 362/256 |
| 5,128,846 | A * | 7/1992 | Mills et al. .................. | 362/224 |
| 5,270,910 | A * | 12/1993 | Kile ............................ | 362/216 |
| 5,387,921 | A * | 2/1995 | Zhang et al. ................ | 345/102 |
| 5,866,984 | A * | 2/1999 | Doughty et al. ............ | 313/643 |
| 6,015,592 | A * | 1/2000 | Mifune et al. ........... | 427/376.2 |
| 6,050,704 | A * | 4/2000 | Park ........................... | 362/260 |
| 6,121,734 | A * | 9/2000 | Szabados .................... | 315/291 |
| 6,135,620 | A * | 10/2000 | Marsh ........................ | 362/377 |
| 6,331,064 | B1 * | 12/2001 | Nishiyama et al. ......... | 362/260 |
| 6,390,638 | B1 * | 5/2002 | Miller et al. .................. | 362/31 |
| 6,402,343 | B1 * | 6/2002 | Vollkommer et al. ....... | 362/256 |
| 6,441,874 | B1 * | 8/2002 | Saito et al. .................... | 349/70 |
| 6,494,587 | B1 * | 12/2002 | Shaw et al. ................... | 362/29 |
| 6,515,433 | B1 * | 2/2003 | Ge et al. ................ | 315/227 R |

(Continued)

FOREIGN PATENT DOCUMENTS

JP    02210327 A *    8/1990

(Continued)

Primary Examiner—Sandra O'Shea
Assistant Examiner—Jason Moon Han
(74) Attorney, Agent, or Firm—Birch, Stewart, Kolasch & Birch, LLP (57) ABSTRACT

A backlight system for use with a liquid-crystal display provides longer lamp lifetime through uniform temperature distribution, offers improved brightness uniformity and enhanced power-supply system efficiency, and ensures safety through lowered voltages. Linear lamps (21, 23) are divided into left and right approximately in the middle. The distance that heat travels is therefore shorter than when linear lamps have a length extending throughout the horizontal direction, which enables more uniform temperature distribution on the entire screen and lengthens the lifetime of linear lamps (21, 23). Furthermore, stray current is halved to achieve uniform brightness and enhanced inverter efficiency and safety can be easily ensured through lowered voltages.

7 Claims, 11 Drawing Sheets

U.S. PATENT DOCUMENTS

| | | | |
|---|---|---|---|
| 6,561,663 B2* | 5/2003 | Adachi et al. | 362/31 |
| 6,674,250 B2* | 1/2004 | Cho et al. | 315/291 |
| 6,722,773 B2* | 4/2004 | Tsai et al. | 362/216 |
| 6,773,130 B1* | 8/2004 | Richardson | 362/92 |
| 6,798,150 B2* | 9/2004 | Moon | 315/169.3 |
| 6,828,720 B2* | 12/2004 | Cavallaro et al. | 313/489 |
| 6,857,759 B2* | 2/2005 | Lee et al. | 362/225 |
| 6,939,020 B2* | 9/2005 | Lim | 362/97 |
| 2003/0035283 A1* | 2/2003 | Lim | 362/97 |
| 2003/0142487 A1* | 7/2003 | Fan | 362/29 |
| 2003/0198038 A1* | 10/2003 | Choi et al. | 362/31 |
| 2003/0227767 A1* | 12/2003 | Lee et al. | 362/23 |
| 2003/0231512 A1* | 12/2003 | Bang et al. | 362/560 |
| 2004/0125599 A1* | 7/2004 | Takeda et al. | 362/263 |

FOREIGN PATENT DOCUMENTS

| | | | |
|---|---|---|---|
| JP | 7-288023 | | 10/1995 |
| JP | 07-288023 | * | 10/1995 |
| JP | 07288023 A | * | 10/1995 |
| JP | 2000-338487 A | | 12/2000 |
| JP | 2002-278471 | | 9/2002 |

* cited by examiner

BACKLIGHT SYSTEM

This Nonprovisional application claims priority under 35 U.S.C. § 119(a) on U.S. patent application Ser. No. 2003-173445 filed in CHINA on Jun. 18, 2003, the entire contents of which are hereby incorporated by reference.

BACKGROUND OF THE INVENTION

1. Field of the Invention

The present invention relates to backlight systems for use in electronic display devices having light sources, such as liquid-crystal displays, and particularly to a backlight system with light-source arrangement, connection, power feeding, and uniformities in light emission from the display surface.

2. Description of the Background Art

Figure 19:
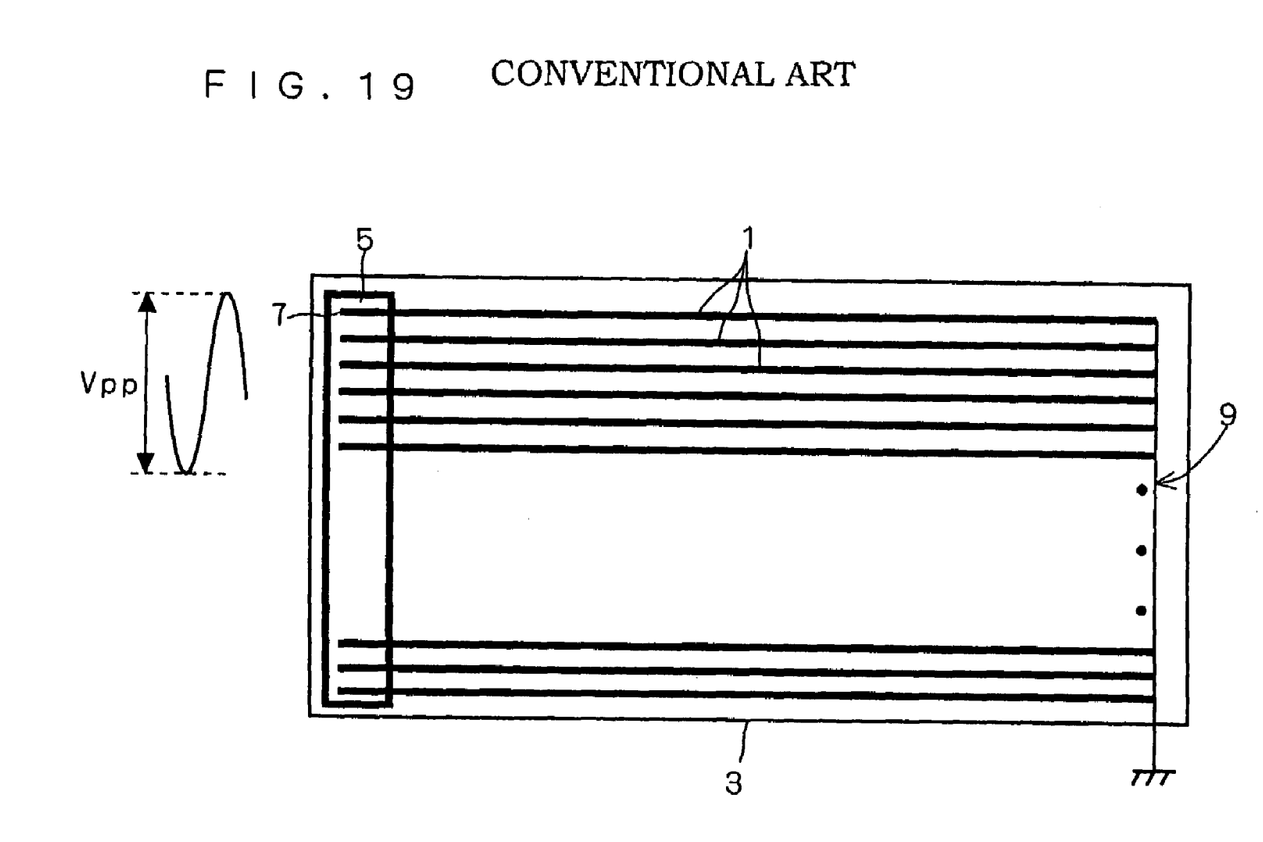
FIG. 19 is a schematic diagram showing an example of a conventional backlight system.

FIG. 19 is a schematic diagram showing an example of a conventional backlight system for use in an electronic display device having a light source, e.g. a liquid-crystal display. In this backlight system, a plurality of parallel-arranged straight CCFL (Cold Cathode Fluorescent Tube) lamps 1, or linear lamps, are accommodated in a lamp house 3, with a single-side power-supply type inverter device 5, as a power-supply unit, placed on one side of the straight CCFL lamps 1; the single-side power-supply type inverter device 5 is connected to hot-side terminals 7 formed at one end of the straight CCFL lamps 1. Cold-side terminals 9, or the lower-voltage side, are formed at the other end of the straight CCFL lamps 1.

Figure 20:
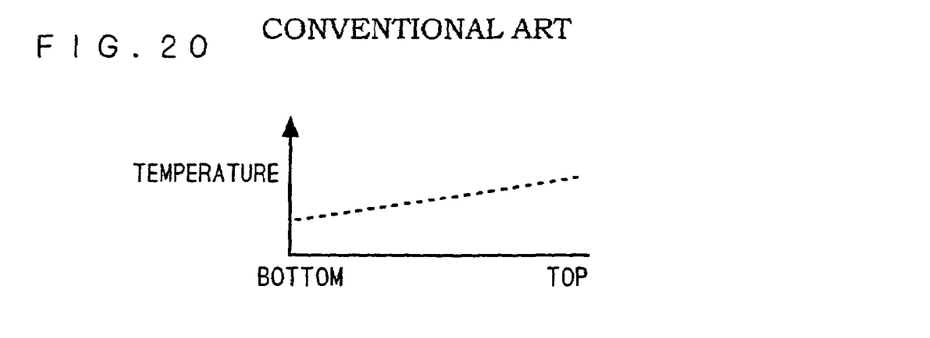
FIG. 20 is a schematic diagram showing vertical temperature distribution of the backlight system shown in FIG. 19.
Figure 21:
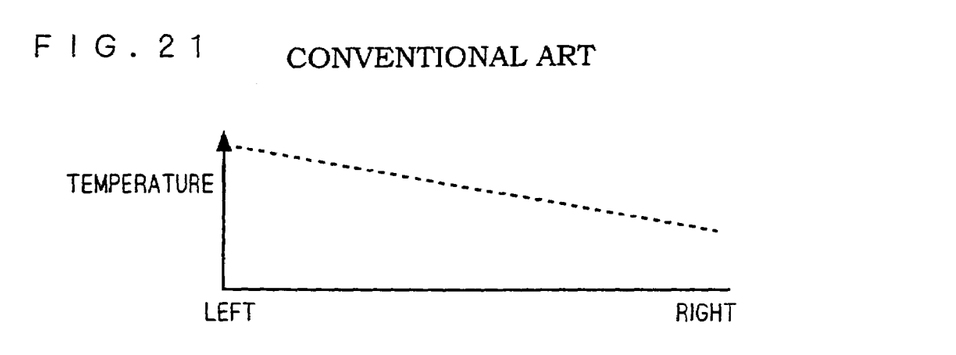
FIG. 21 is a schematic diagram showing horizontal temperature distribution of the backlight system of FIG. 19.
Figure 22:
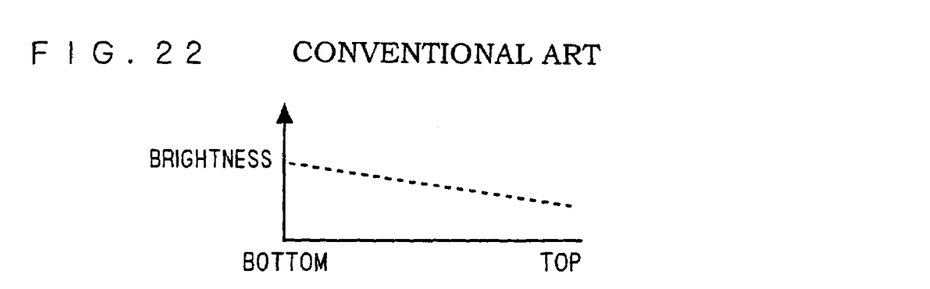
FIG. 22 is a schematic diagram showing vertical brightness distribution of the backlight system of FIG. 19.
Figure 23:
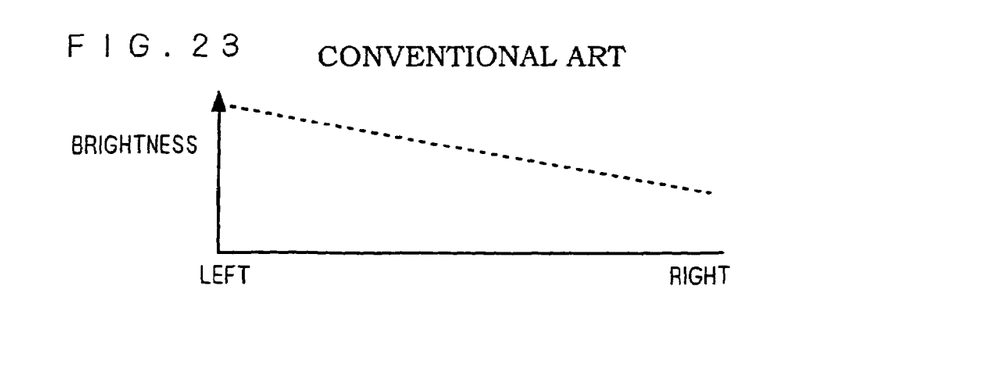
FIG. 23 is a schematic diagram showing horizontal brightness distribution of the backlight system of FIG. 19.
Figure 24:
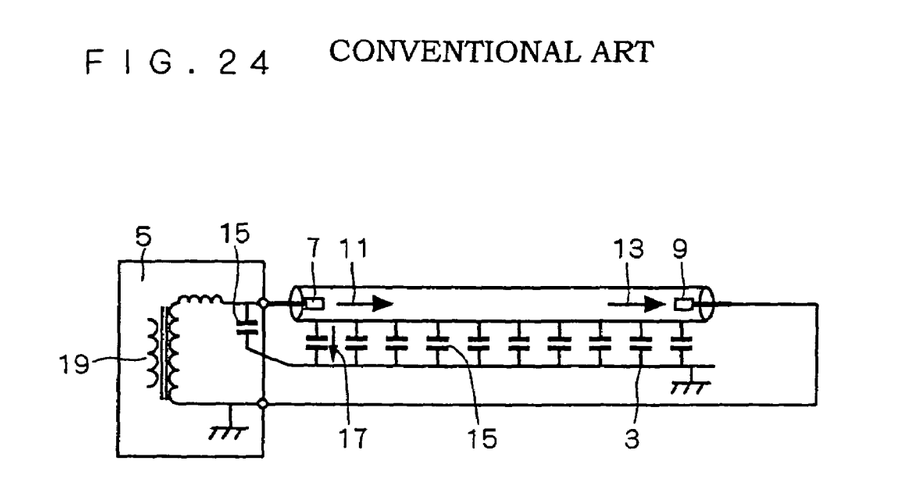
FIG. 24 is an explanation diagram showing stray capacitance occurring in the conventional backlight system.

FIG. 20 shows the temperature distribution in the vertical direction (bottom-to-top direction) of the backlight system shown in FIG. 19, FIG. 21 shows the temperature distribution in the horizontal direction (left-to-right direction on the screen), FIG. 22 shows the brightness distribution in the vertical direction (bottom-to-top direction), and FIG. 23 shows the brightness distribution in the horizontal direction (left-to-right direction). FIG. 24 is an enlarged view showing straight CCFL lamp 1 and single-side power-supply type inverter device 5 in the backlight system of FIG. 19.

As shown in FIGS. 19 and 24, the single-side power-supply type inverter device 5 applies an ac voltage to hot-side terminal 7 of horizontally-placed straight CCFL lamp 1, causing an ac current (tube current) to flow from the hot-side terminal 7 to the cold-side terminal 9, so as to cause the straight CCFL lamp 1 to emit light. At this time, the voltage applied to the hot-side terminals 7 is a high voltage from several hundred Vrms to one thousand Vrms, while the cold-side terminals 9 are at a low voltage of nearly 0 Vrms.

In FIG. 24, reference numeral 11 denotes the tube current flowing at hot-side terminal 7 and reference numeral 13 denotes the tube current flowing at cold-side terminal 9.

The lamp house 3 is made of metal, e.g. aluminum or its alloy; since such a high voltage is applied to straight CCFL lamps 1 as mentioned above, stray capacitances 15 form in the space between the lamp house 3 and the straight CCFL lamps 1 and the lines connecting from single-side power-supply type inverter device 5 to straight CCFL lamps 1.

In FIG. 20, the temperature is relatively higher on the upper side of the display screen than on the lower side because of external factors, such as heat generation in the liquid-crystal display driving circuitry.

Techniques that use U-shaped tubes as backlights are also disclosed (for example, refer to Japanese Patent Application Laid-Open Nos. 7-288023 (1995) and 2002-278471).

In the conventional backlight system above, it is necessary to dispose the single-side power-supply type inverter device 5 in the vicinity of the hot-side terminals 7 or power-supply terminals. Therefore, as shown in FIGS. 20 and 21, the temperature is elevated to the side of hot terminals 7 (at the right in FIG. 20 and the left in FIG. 21) due to heat generation from the single-side power-supply type inverter device 5. Such temperature difference between the electrodes 7 and 9 of straight CCFL lamps 1 causes mercury to concentrate in the lower-temperature portion and then sputtering occurs at mercury-lacking terminals, which shortens the life of lamps.

Figure 25:
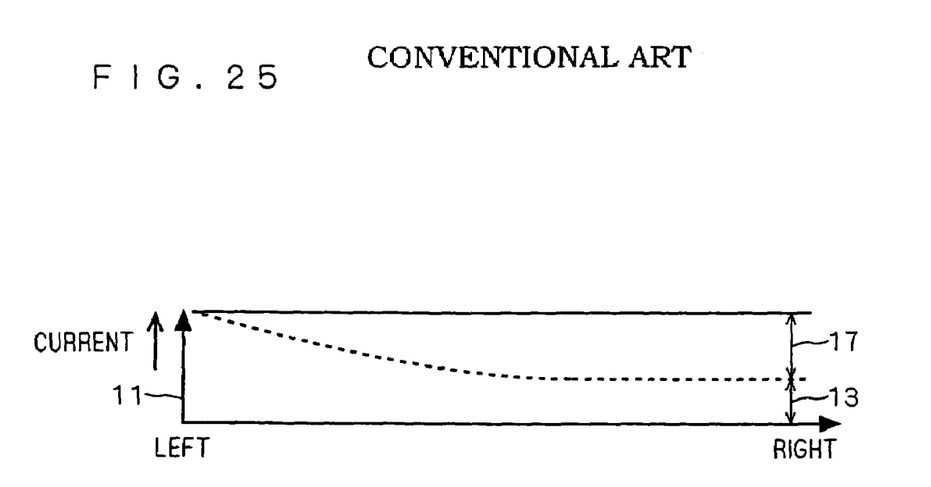
FIG. 25 is a diagram showing leakage current distribution of the conventional system.

Also, when stray capacitance 15 (FIG. 24) causes leakage current 17, then, as shown in FIG. 25, the tube current 13 near the cold-side terminals 9 becomes lower by the leakage current 17 than the tube current 11 near the higher-voltage hot-side terminals 7. This causes large difference in brightness particularly in the left-to-right direction on the screen (FIG. 23).

The leakage current 17 flowing through stray capacitance 15 is a reactive current that does not contribute to light emission of the straight CCFL lamps 1, and larger exciting current flows through the transformer's primary winding 19 of the single-side power-supply type inverter device 5. This leads to a reduction in power efficiency of the single-side power-supply type inverter device 5.

These problems arise also with such U-shaped tubes as are disclosed in the two Patent Documents cited above.

SUMMARY OF THE INVENTION

An object of the present invention is to provide a backlight system that is capable of lengthening lamp lifetime through uniform temperature distribution, improving brightness uniformity, enhancing power-supply system efficiency, and ensuring safety through lowered voltages.

The present invention relates to backlight systems for use in electronic display devices having light sources, such as liquid-crystal displays, and particularly to a backlight system with light-source arrangement, connection, power feeding, and uniformities in light emission from the display surface.

The present invention also provides a backlight system that includes: a plurality of linear lamps placed vertically to a length direction of a display screen, wherein the plurality of linear lamps are bent tubes that are bent back at one end and have both terminals formed at the other end; and a power-supply unit placed in the vicinity of the other end of the linear lamps, for supplying power to both terminals.

The linear lamps are divided in the length direction approximately in the middle in the length direction of the display screen, or the liner lamps are placed vertically to the length direction of the display screen, so that the heat conduction distance is shorter than when the linear lamps have a length extending throughout the length direction of the display screen. This enables more uniform temperature distribution on the entire screen and lengthens the lifetime of lamps. Furthermore, stray current is halved to achieve uniform brightness and enhanced inverter efficiency and safety can be easily ensured through lowered voltages.

The present invention also provides a backlight system that includes: a plurality of linear lamps placed vertically to a length direction of a display screen, wherein the plurality of linear lamps are bent tubes that are bent back at one end and have both terminals formed at the other end; and a power-supply unit placed in the vicinity of the other end of the linear lamps, for supplying power to both terminals.

Since the length of the linear lamps extending in the vertical direction of the screen is shorter than the length in the horizontal direction, the heat conduction distance is shorter and therefore temperature difference in the vertical direction is kept small. Furthermore, almost no temperature difference occurs in the horizontal direction and brightness distribution is uniform in the horizontal direction in which brightness difference is more recognizable.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
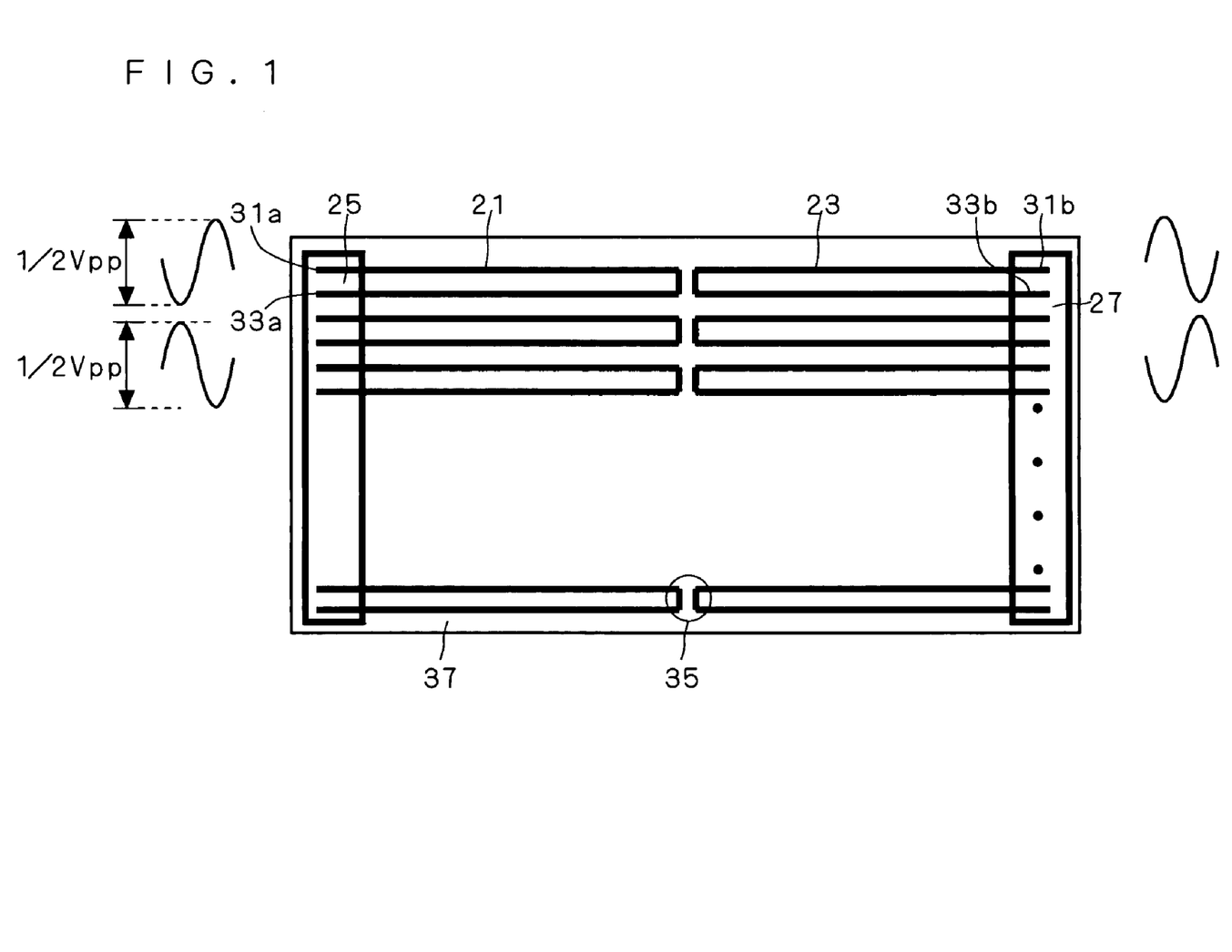
FIG. 1 is a schematic diagram showing a backlight system according to a first preferred embodiment of the invention.

FIG. 1 is a schematic diagram showing the backlight system according to a first preferred embodiment of the invention. This preferred embodiment illustrates as an example an electronic display device whose display screen is wider than it is high.

This backlight system is used for rear illumination in a large-area electronic display device such as a large-sized liquid-crystal display. As shown in FIG. 1, a plurality of bent tubes 21 and 23, or U-shaped CCFL lamps, are arranged as linear lamps; in particular, the area is divided into left and right halves where bent tubes 21 and 23 are separately disposed opposite to each other. The bent tubes 21 on the left are supplied with power from a first floating power-supply type inverter device 25 provided at the left end and the bent tubes 23 on the right are supplied with power from a second floating power-supply type inverter device 27 provided at the right end.

Each bent tube 21 or 23 has power-supply hot-side terminals 31a, 33a, or 31b, 33b at both ends, which are connected to the corresponding floating power-supply type inverter devices 25, 27 and supplied with mutually inverted ac voltages. Bent portions 35 are disposed between the bent tubes 21 and 23, or in the middle in the horizontal direction of the screen. Since the hot-side terminals 31a and 33a, and 31b and 33b are closely arranged at both ends, it is easy to form a condition in which temperature difference is small between hot-side terminals 31a, 33a, 31b, 33b.

Note that, reference numeral 37 in FIG. 1 shows a CCFL lamp house made of metal.

The operation of this backlight system is now described. As shown in FIG. 1, in a pair of U-shaped CCFL lamps 21 and 23 placed in the horizontal direction of the screen, the hot-side terminals 31a and 33a, or both terminals of the U-shaped CCFL lamp 21 on the left, are supplied from the first floating power-supply type inverter device 25 with ac voltages differing in phase by 180°. The applied voltages cause a flow of ac current in the left-hand U-shaped CCFL lamp 21, causing the U-shaped CCFL lamp 21 to emit light. The voltages applied to the two hot-side terminals 31a and 33a are both about ½ the power-supply voltage Vpp of the conventional single-side power-supply type inverter device 5 shown in FIG. 19.

The other of the horizontally-arranged lamps, or the U-shaped CCFL lamp 23 on the right, operates on the same principle; the second floating power-supply type inverter device 27 applies ac voltages differing in phase by 180° to two hot-side terminals 31b and 33b, causing an ac current to cause the right-hand U-shaped CCFL lamp 23 to emit light.

Thus, with the first (left-hand) U-shaped CCFL lamps 21 bent back at the bent portions 35 in the middle of the screen, and with the second (right-hand) U-shaped CCFL lamps 23 horizontally placed to form symmetry, the two floating power-supply type inverter devices 25 and 27 are also arranged in symmetry.

Figure 2:
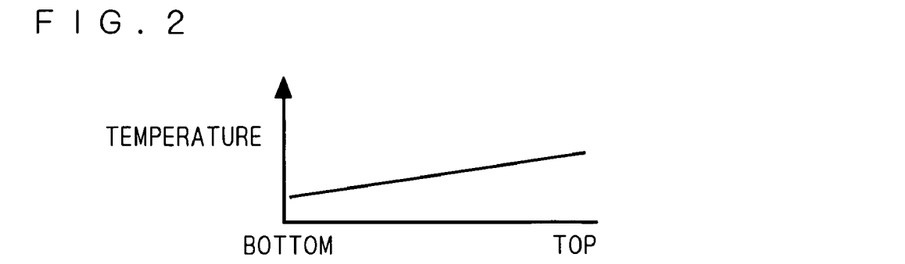
FIG. 2 shows vertical temperature distribution of the backlight system of the first preferred embodiment of the invention.
Figure 3:
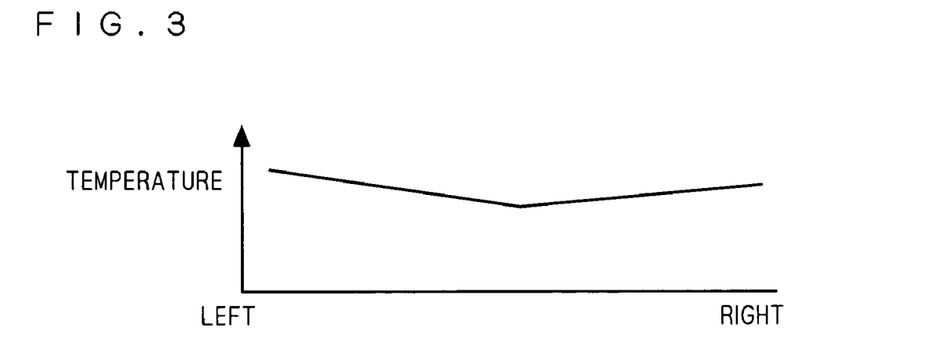
FIG. 3 shows horizontal temperature distribution of the backlight system of the first preferred embodiment of the invention.
Figure 4:
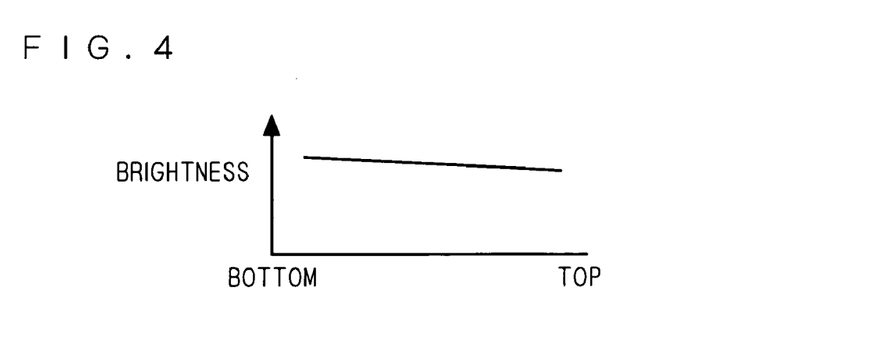
FIG. 4 shows vertical brightness distribution of the backlight system of the first preferred embodiment of the invention.
Figure 5:
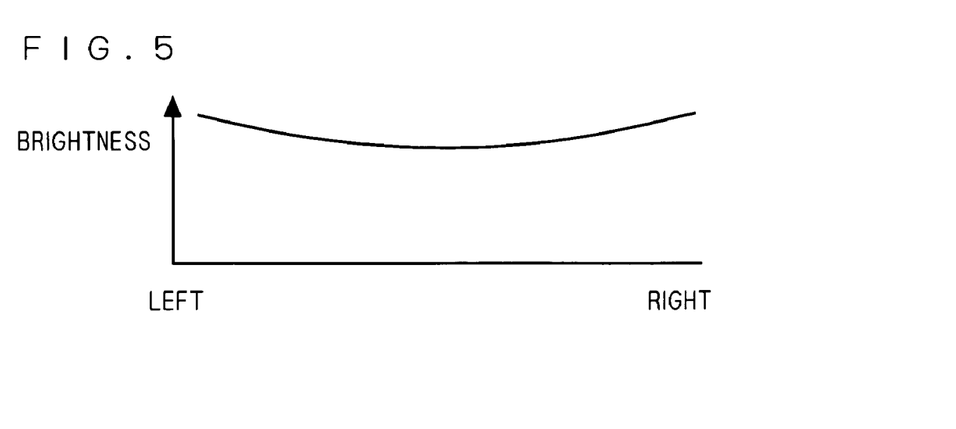
FIG. 5 shows horizontal brightness distribution of the backlight system of the first preferred embodiment of the invention.

FIG. 2 shows the temperature distribution in the vertical direction (bottom-to-top direction) of the backlight system of FIG. 1, FIG. 3 shows the temperature distribution in the horizontal direction (left-to-right direction on the screen), FIG. 4 shows the brightness distribution in the vertical direction (bottom-to-top direction), and FIG. 5 shows the brightness distribution in the horizontal direction (left-to-right direction on the screen).

As shown in FIG. 2, the temperature varies in the vertical direction (bottom-to-top direction). However, since the U-shaped CCFL lamps 21 and 23 are bent back at bent portions 35 in the middle and every two of bent tubes (U-shaped CCFL lamps 21, 23) are horizontally placed in symmetry, the two floating power-supply type inverter devices 25 and 27 are also arranged in symmetry, so that the temperature is dispersed on either side and the temperature rise to the left is smaller. Furthermore, as shown in FIG. 3, the horizontal temperature distribution of the backlight system is symmetrical; also the distance from the middle part at the lowest temperature (i.e. the bent portions 35) to the hot-side terminals 31a, 33a, 31b, 33b is about half that of the conventional one shown in FIG. 19 because the lamps 21 and 23 are bent back in the central bent portions 35. The horizontal temperature difference of the backlight system can thus be reduced on the whole, as compared with that shown in FIG. 21.

Moreover, since the hot-side terminals 31a and 33a, and 31b and 33b (power-supplied parts) of the U-shaped CCFL lamps 21 and 23 are arranged adjacent, it is easy to adopt a system in which both-side electrodes are fed with voltages differing in phase by 180 (i.e. floating power-supply system). This power-supply system allows the voltage applied to one electrode (e.g. hot-side terminal 31a) to be about half (=½ Vpp) that of the conventional single-side power-supply type inverter device 5 (FIG. 19). Furthermore, since no temperature difference is caused between two electrodes, it is possible to alleviate the conventional problem that concentration of mercury in the lower-temperature portion causes sputtering at mercury-lacking electrodes to shorten lamp's lifetime: the lamps' lifetime can thus be lengthened.

Now, when U-shaped CCFL lamps 21 and 23 have the same full length as the straight CCFL lamp 1 shown in FIG. 19, for example, the stray capacitance occurring between the U-shaped CCFL lamps 21 and 23 and the lamp house 37 is the same as the stray capacitance 15 occurring when the conventional straight CCFLs 1 and single-side power-supply type inverter device 5 are used (see FIG. 24). However, voltages fed from each inverter device 25, 27 are approximately ½ Vpp and therefore leakage current caused by the stray capacitance is halved. Thus, although, as shown in FIG. 4, the top-to-bottom brightness distribution varies as in conventional devices, the brightness distribution in the left-to-right direction of the screen, which is more recognizable, can be uniform on the entire screen as shown in FIG. 5.

Thus, enabling more uniform temperature distribution on the whole screen lengthens lamps' lifetime, and halving the stray current enables uniform brightness and improved inverter efficiency, and lowered voltages facilitates safety.

Furthermore, it is convenient that the system can be easily designed to control temperature distribution and brightness difference by adjusting vertical and horizontal intervals between bent tubes 21 and 23.

Second Preferred Embodiment

Figure 6:
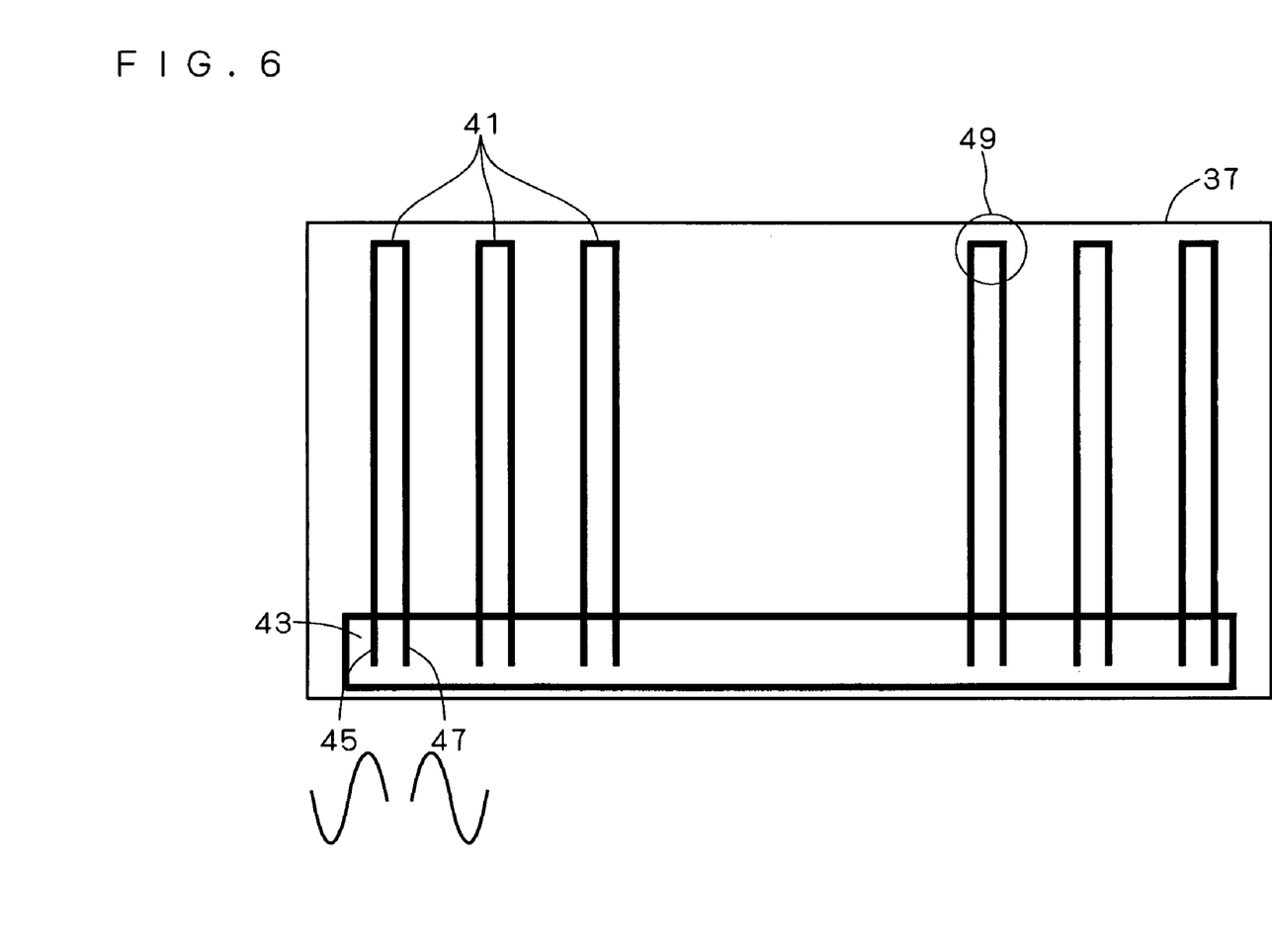
FIG. 6 is a schematic diagram showing a backlight system according to a second preferred embodiment of the invention.

FIG. 6 is a schematic diagram showing the backlight system according to a second preferred embodiment of the invention. This preferred embodiment, too, illustrates as an example an electronic display device whose display screen is wider than it is high.

As shown in FIG. 6, in the backlight system of this preferred embodiment, each U-shaped CCFL lamp (bent tube) 41 is extended vertically in the screen; a plurality of such U-shaped CCFL lamps 41 are arranged side by side in the horizontal direction.

A floating power-supply type inverter device 43 is positioned at the lower end of the U-shaped CCFL lamps 41.

Hot-side terminals 45 and 47, or power-supply terminals at both ends of each U-shaped CCFL lamp 41, are formed at the lowermost end and connected to the floating power-supply type inverter device 43 located close to them. Bent portions 49 of U-shaped CCFL lamps 41 are located in the uppermost position.

In other respects, the configuration is the same as that of the first preferred embodiment.

The floating power-supply type inverter device 43 applies ac voltages differing in phase by 180 to the hot-side terminals 45 and 47 at both ends, which cause a flow of ac current in U-shaped CCFL lamp 41, causing the U-shaped CCFL lamp 41 to emit light.

With this configuration, long-sized tubes having an overall length of 1300 mm, manufacturable as straight tubes, are bent and the bent tubes are vertically placed (1300-mm is generally applicable up to panel size 52"), with their power-supply hot-side terminals 45 and 47 located in the lower part of the system, and thus the floating power-supply type inverter device 43 can be extended in an elongate manner at the bottom of the backlight system.

Figure 7:
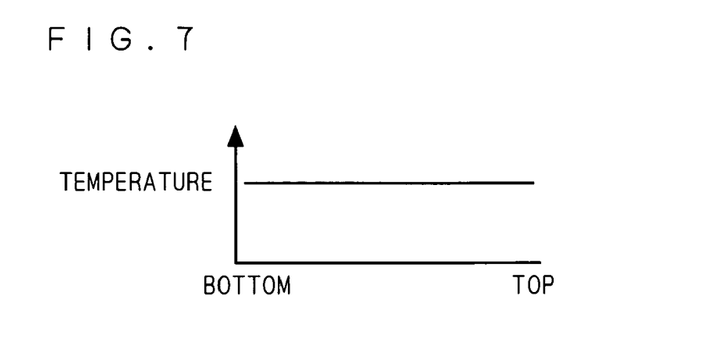
FIG. 7 shows vertical temperature distribution of the backlight system of the second preferred embodiment of the invention.

Therefore heat generated from the floating power-supply type inverter device 43 travels from bottom to top of the backlight system. However, since the vertical dimension of the screen is smaller than the horizontal dimension, the heat travels a shorter distance and the vertical temperature difference can be kept small. Furthermore, while, as shown in FIG. 20, the temperature in the upper part of the display screen is relatively higher than the temperature in its lower part because of heat generation from the liquid-crystal display driving circuitry, the floating power-supply type inverter device 43 and both hot-side terminals 45, 47 are arranged in such a way as to cancel the temperature difference. The temperature difference in the bottom-to-top direction is thus nearly unnoticeable as shown in FIG. 7.

Figure 8:
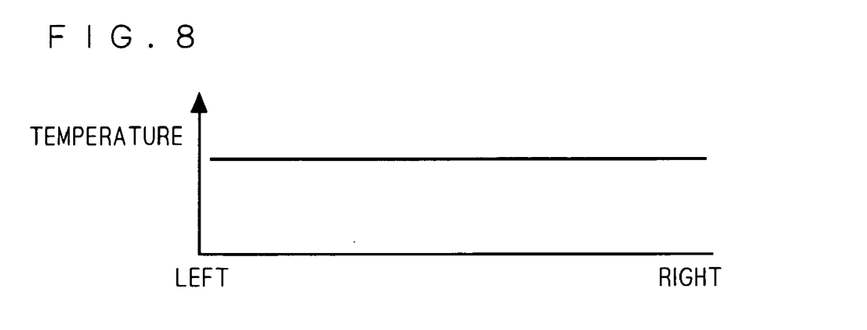
FIG. 8 shows horizontal temperature distribution of the backlight system of the second preferred embodiment of the invention.

As to the horizontal temperature difference in which heat travels a longer distance than in the vertical direction, heat generated from the floating power-supply type inverter device 43, located in an elongated manner in the lower part, uniformly travels from bottom to top of the backlight system, so that nearly no temperature difference occurs in the left-to-right (horizontal) direction.

Figure 9:
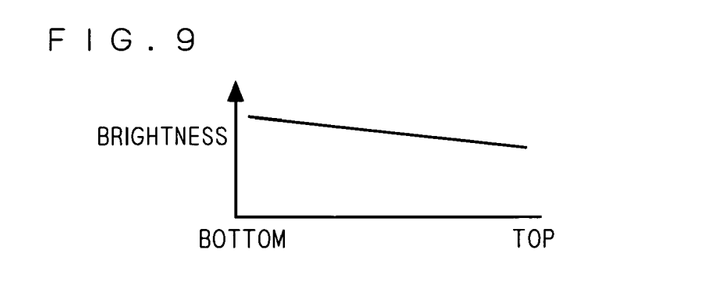
FIG. 9 shows vertical brightness distribution of the backlight system of the second preferred embodiment of the invention.
Figure 10:
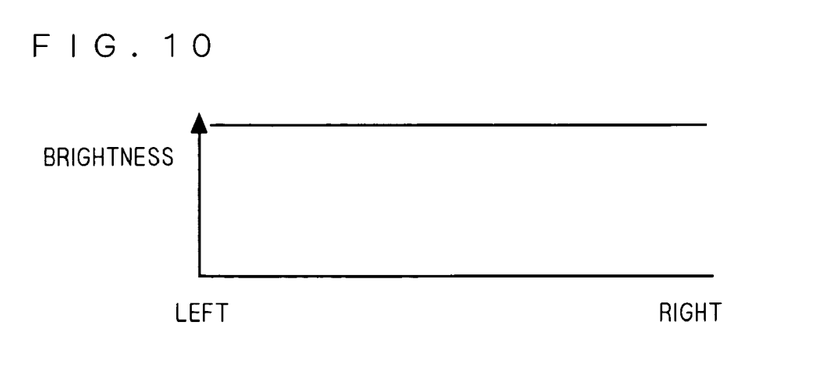
FIG. 10 shows horizontal brightness distribution of the backlight system of the second preferred embodiment of the invention.

Furthermore, leakage current causes a slight difference in brightness in the vertical (bottom-to-top) direction (FIG. 9), but, as shown in FIG. 10, the brightness distribution is uniform in the horizontal direction of the screen in which brightness difference is likely to be recognizable.

Also, in a liquid-crystal display having an aspect ratio of 16:9, for example, arranging U-shaped CCFL lamps 21 and 23 on left and right as shown in FIG. 1 of the first preferred embodiment requires, on either side, U-shaped CCFL lamps 21 and 23 of a number corresponding to the height dimension of the liquid-crystal display (i.e. twice the number corresponding to the height dimension). However, this preferred embodiment just requires U-shaped CCFL lamps 41 of a number corresponding to the width dimension, i.e. a less number of U-shaped CCFL lamps 41 than in the first preferred embodiment of FIG. 1. This enables a lower-priced highly-efficient system.

Third Preferred Embodiment

Figure 11:
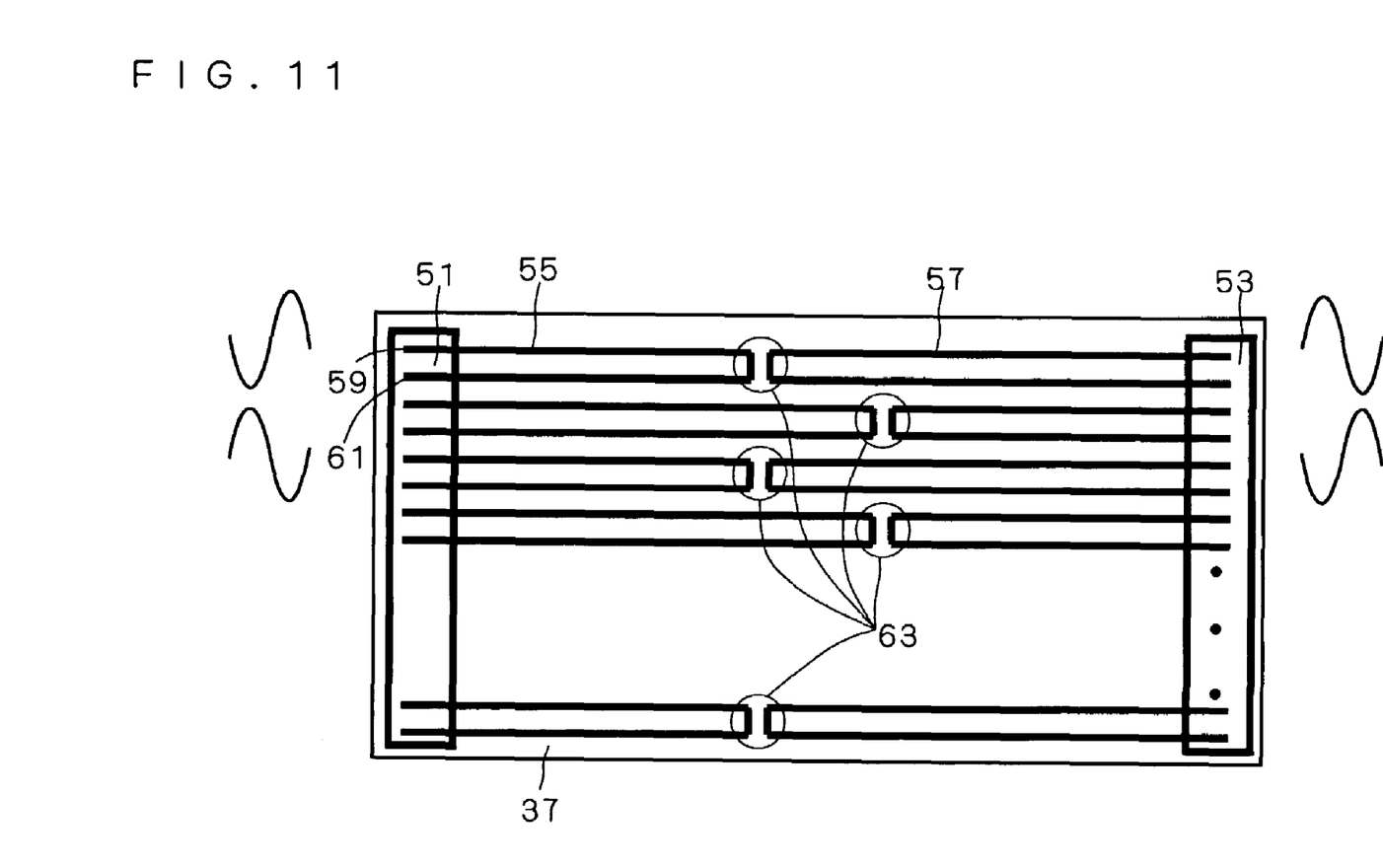
FIG. 11 is a schematic diagram showing a backlight system according to a third preferred embodiment of the invention.

FIG. 11 is a diagram showing the backlight system according to a third preferred embodiment of the invention. This preferred embodiment, too, illustrates as an example an electronic display device whose display screen is wider than it is high.

In the backlight system of this preferred embodiment, as in the system of the first preferred embodiment shown in FIG. 1, floating power-supply type inverter devices 51 and 53 are disposed on left and right, the screen is divided into left and right areas, and U-shaped CCFL lamps (bent tubes) 55 and 57 arranged left and right provides illumination. However, in the third preferred embodiment, oppositely-placed U-shaped CCFL lamps 55 and 57 on left and right have different lengths. In FIG. 11, reference numerals 59 and 61 denote hot-side terminals as power-supply terminals and reference numeral 63 denotes bent portions.

In other respects the configuration is the same as those of the above-described preferred embodiments.

In general, with U-shaped CCFL lamps, the quantity of light is thin or thick in the area where two opposite U-shaped CCFL lamps are closely located, i.e., in the area where the bent portions of two U-shaped CCFL lamps are located together, which is recognized as local brightness non-uniformity on the display screen. When viewed, the non-uniformity of brightness is particularly noticeable if bent portions 35 of U-shaped CCFL lamps 21 and 23 are arranged on the same line as shown in FIG. 1 in the first preferred embodiment.

However, according to the third preferred embodiment, bent portions 63 are not positioned on the same line since U-shaped CCFL lamps 55 and 57 of different lengths are oppositely disposed left and right, and therefore the luminous flux density at bent portions 63 can be dispersed on the display screen. This alleviates brightness difference on the display screen.

Fourth Preferred Embodiment

Figure 12:
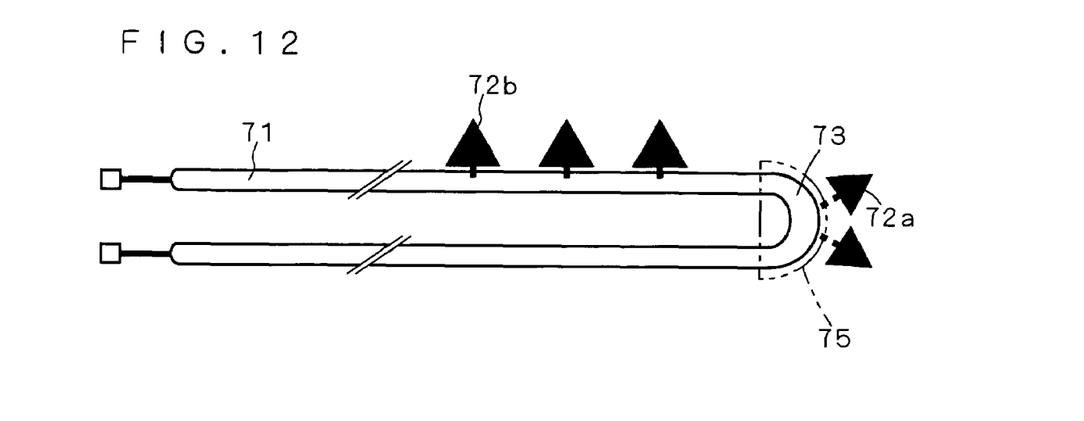
FIG. 12 is a schematic diagram showing a backlight system according to a fourth preferred embodiment of the invention.

FIG. 12 is a diagram showing the backlight system of a fourth preferred embodiment of the invention. This preferred embodiment, too, illustrates as an example an electronic display device whose display screen is wider than it is high.

In the backlight system of this preferred embodiment, as in the first preferred embodiment shown in FIG. 1 or the third preferred embodiment shown in FIG. 11, floating power-supply type inverter devices (not shown) are disposed on the right and left, the screen is divided into right and left areas, and U-shaped CCFL lamps (bent tubes) 71 arranged in respective areas provide illumination. However, as shown in FIG. 12, a masking portion (a coating portion: quantity of emitted light controlling means) 75, for suppressing the quantity of emitted light, is formed at the bent portion 73 where luminous flux 72*a* tends to concentrate when the display screen is viewed. In the masking portion 75, a gray seal, for example, is applied at the bent portion 73 to suppress the quantity of emitted light.

In other respects the structure is the same as those of the above-described preferred embodiments.

Thus, the masking portion 75 formed at the bent portion 73 of U-shaped CCFL lamp 71 controls the quantity of emitted light or luminous flux 72*a* at the portion where a pair of oppositely-arranged U-shaped CCFL lamps 71 reside close (i.e. at the bent portion 73) to make it equivalent to the quantity of emitted light of luminous flux 72*b* in the area other than the bent portion 73. This suppresses difference in the quantity of light that is caused by local difference in the quantity of luminous flux, thus suppressing non-uniformity of brightness and enabling uniform brightness on the display screen.

Fifth Preferred Embodiment

Figure 13:
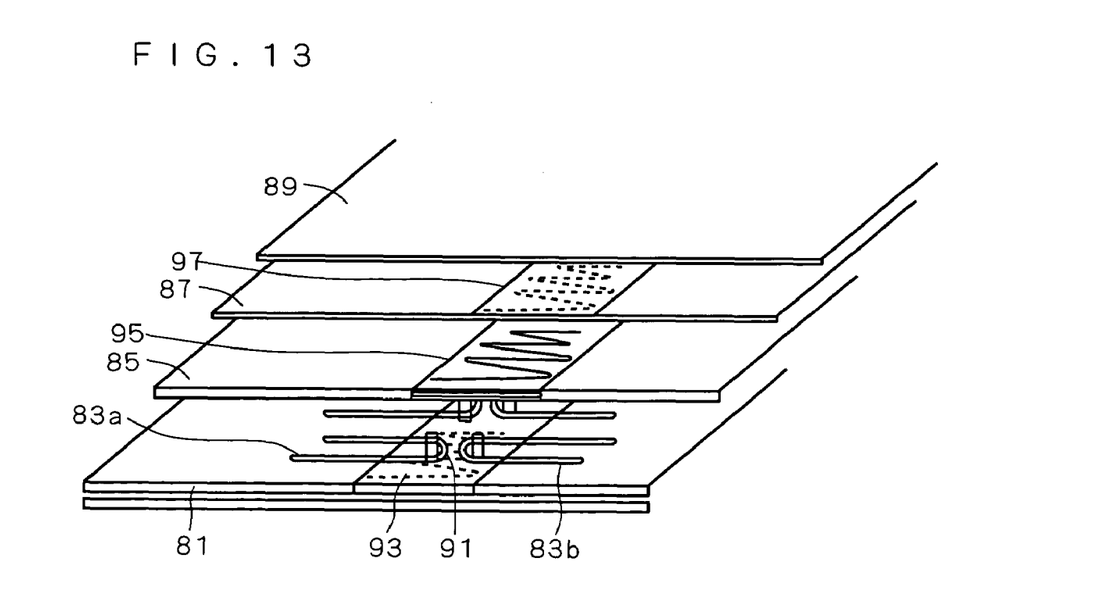
FIG. 13 is a schematic diagram showing a backlight system according to a fifth preferred embodiment of the invention.

FIG. 13 is a schematic diagram showing the backlight system according to a fifth preferred embodiment of the invention. This preferred embodiment, too, illustrates as an example an electronic display device whose display screen is wider than it is high.

In the backlight system of this preferred embodiment, a reflection plate (a reflector: reflecting means) 81 is disposed at the rear of U-shaped CCFL lamps (bent tubes) 83*a*, 83*b*, and a diffusion plate (diffusing means) 85 for diffusing light and an optical film (light transmission controlling means) 87 for controlling light transmission are sequentially disposed in front of the U-shaped CCFL lamps 83*a*, 83*b*. Light emitted from the U-shaped CCFL lamps 83*a* and 83*b* is reflected forward at the reflection plate 81 at the rear and the reflected light from the reflection plate 81 and direct light from the U-shaped CCFL lamps 83*a*, 83*b* are diffused at the diffusion plate 85, which are further transmitted through the optical film 87 to illuminate the liquid-crystal display (LCD) 89 from behind.

In the fifth preferred embodiment, as in the first preferred embodiment shown in FIG. 1 or the third preferred embodiment shown in FIG. 11, floating power-supply type inverter devices (not shown) are disposed on both sides, the screen is divided into left and right areas, and U-shaped CCFL lamps 83*a*, 83*b* are arranged in the respective areas.

The metal lamp house is used also as the reflection plate 81.

The reflectance of the surface area 93 of the reflection plate 81 which corresponds to the bent portions 91 of U-shaped CCFL lamps 83*a*, 83*b* is set different from that of the remaining area. For example, when the quantity of light at bent portions 91 of U-shaped CCFL lamps 83*a*, 83*b* is larger than in the remaining area, the corresponding surface area 93 of the reflection plate 81 is formed rough so that it irregularly reflects light to lower the reflectance. On the other hand, when the quantity of light at bent portions 91 of U-shaped CCFL lamps 83*a*, 83*b* is smaller than that in the remaining area, the corresponding surface area 93 of the reflection plate 81 is formed like mirror surface and the remaining area is formed rough so that light is irregularly reflected to lower the reflectance.

Diffusion characteristic of diffusion area 95 of diffusion plate 85 that corresponds to bent portions 91 of U-shaped CCFL lamps 83*a*, 83*b* is set different from that in the remaining area. For example, when the quantity of light at bent portions 91 of U-shaped CCFL lamps 83*a*, 83*b* is larger than that in the remaining area, then the diffusivity in the corresponding diffusion area 95 is set higher than that in the remaining area. On the other hand, when the quantity of light at bent portions 91 of U-shaped CCFL lamps 83*a*, 83*b* is smaller than that in the remaining area, the diffusivity in the corresponding diffusion area 95 is set lower than that in the remaining area.

Also, the transmittance of the area 97 of the optical film 87 that corresponds to bent portions 91 of U-shaped CCFL lamps 83*a*, 83*b* is set different from that in the remaining area. For example, when the quantity of light at bent portions 91 of U-shaped CCFL lamps 83a, 83b is larger than in the remaining area, then the transmittance in the corresponding area 97 of optical film 87 is set lower than in the remaining area. On the other hand, when the quantity of light at bent portions 91 of U-shaped CCFL lamps 83a, 83b is smaller than in the remaining area, the transmittance of the corresponding area 97 of optical film 87 is set higher than in the remaining area.

In other respects the configuration is the same as those of the above-described preferred embodiments.

Thus, in the structure using reflection plate 81, diffusion plate 85, and optical film 87, characteristics of light-flux reflection, diffusion, and transmission in the areas 93, 95 and 97 corresponding to the bent portions 91 of U-shaped CCFL lamps 83a, 83b are set different from those in the remaining area. This configuration is capable of suppressing light incident upon the liquid-crystal display 89 from the area (or bent portions 91) where pairs of oppositely-arranged U-shaped CCFL lamps 83a, 83b reside close. The brightness in the areas 93, 95, 97 can thus be controlled to be equivalent to that in the remaining area. It is therefore possible to suppress difference in the quantity of light due to local difference in the quantity of luminous flux, so as to suppress non-uniformity of brightness and enable uniform brightness on the display screen.

In particular, optical characteristics of reflection plate 81, diffusion plate 85 and optical film 87 can be adjusted at the same time on left and right, which facilitates designing.

In this preferred embodiment, the reflection plate 81, diffusion plate 85 and optical film 87 all suppress light entering liquid-crystal display 89 from U-shaped CCFL lamps 83a, 83b. However, no problem arises when just one of the reflection plate 81, diffusion plate 85 and optical film 87 is configured to suppress light entering the liquid-crystal display 89 from U-shaped CCFL lamps 83a, 83b.

The reflection plate 81 may be curved; for example, the hot sides at the edges of the screen may be formed as wide-angle reflector to disperse reflected light, with the cold side in the middle of the screen formed as narrow-angle reflector to concentrate reflected light, so as to alleviate brightness difference on the whole screen.

Sixth Preferred Embodiment

Figure 14:
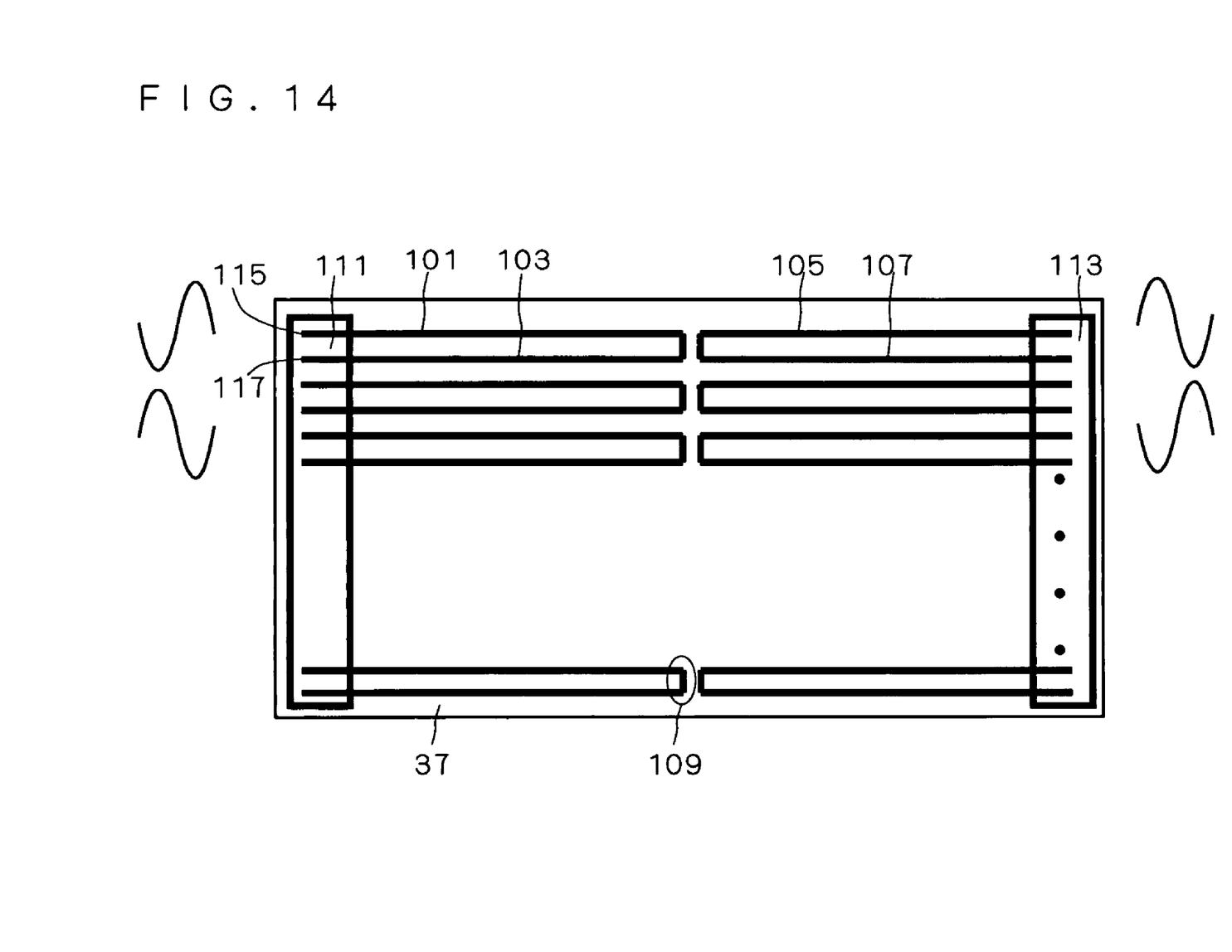
FIG. 14 is a schematic diagram showing a backlight system according to a sixth preferred embodiment of the invention.

FIG. 14 is a schematic diagram showing the backlight system of a sixth preferred embodiment of the invention. This preferred embodiment, too, illustrates as an example an electronic display device whose display screen is wider than it is high.

In the backlight system of this preferred embodiment, as in the conventional example shown in FIG. 19, a plurality of straight tubes (straight CCFL lamps) 101, 103, 105 and 107 are placed in an elongated manner. However, it is different from the conventional example in that the straight tubes 101, 103, 105 and 107 are divided in the middle of the display screen and straight tubes disposed vertically adjacent (101 and 103, and 105 and 107) are electrically connected through connectors 109 located in the middle of the display screen. The straight tubes 101, 103, 105 and 107, separated on the left and right, are respectively fed with power by floating power-supply type inverter devices 111 and 113 disposed at the left and right edges of the display screen.

More specifically, electric wires are used as the connectors 109 connecting vertically-adjacent straight tubes (101 and 103, and 105 and 107).

Reference numerals 115 and 117 denote hot-side terminals connecting the floating power-supply type inverter device 111 and straight tubes 101 and 103 and reference numeral 37 denotes a lamp house. Thus, the straight tubes 101, 103, 105 and 107 are fed with power at the hot-side terminals 115 and 117 at both ends of the display screen from the floating power-supply type inverter devices 111 and 113, with the straight tubes 101, 103, 105 and 107 bent back at connectors 109 in the middle of the display screen.

In other respects the configuration is the same as those of the preferred embodiments shown above.

Figure 15:
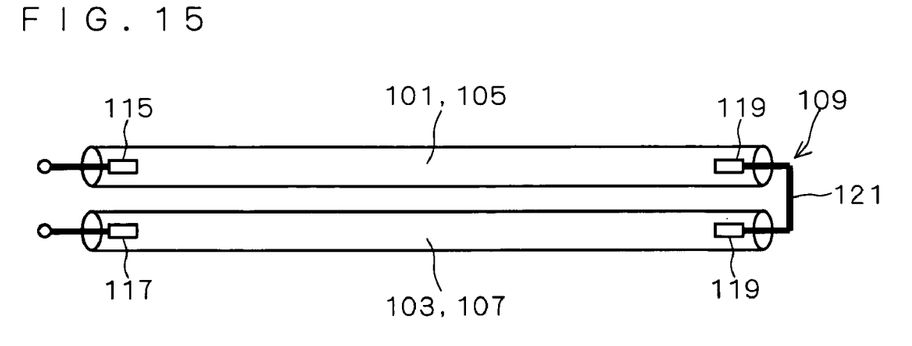
FIG. 15 is a schematic diagram showing an example of linear lamps of the backlight system of the sixth preferred embodiment of the invention.

With this structure, as shown in FIG. 15, vertically adjacent straight tubes (101 and 103, and 105 and 107) are connected by conductive connector material 121 at their respective electrodes 119 located in the middle of the display screen. Thus, two straight tubes 101 and 103, 105 and 107, can be easily connected to each other at one of their respective electrodes.

With this structure, pairs of oppositely-arranged straight tubes 101, 103, 105, 107, disposed on right and left, provide back-side illumination as in conventional apparatuses. Also, as in the first preferred embodiment, temperature distribution on the entire screen is more uniform than in conventional ones and lamp's lifetime is lengthened, and stray current can be halved to achieve more uniform brightness and improved inverter efficiency, and safety can be easily ensured through lowered voltages.

Furthermore, the length of each straight tube 101, 103, 105, 107 is shorter than that of U-shaped CCFL lamps described in the first preferred embodiment, which allows use of straight tubes 101, 103, 105, 107 having a smaller lamp diameter. This enables a backlight system with superior power-to-brightness efficiency.

Figure 16:
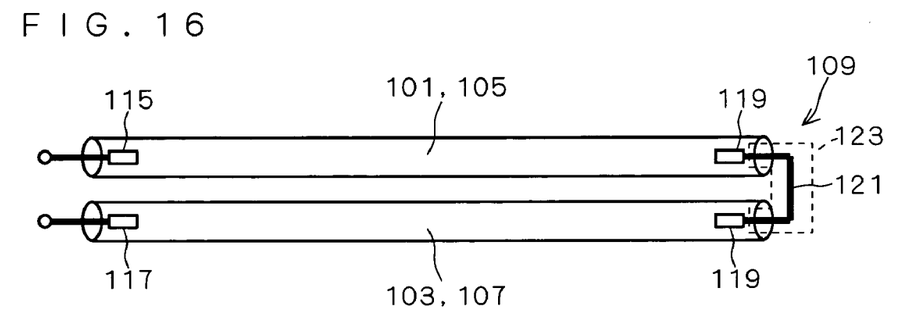
FIG. 16 is a schematic diagram showing another example of linear lamps of the backlight system of the sixth preferred embodiment of the invention.

In this case, as shown in FIG. 16, each connector 109 is preferably shielded and protected with an insulating member 123.

The connectors 109 of vertically adjacent straight tubes 101, 103, 105 and 107 can thus be easily shielded and insulated at low cost.

Seventh Preferred Embodiment

Figure 17:
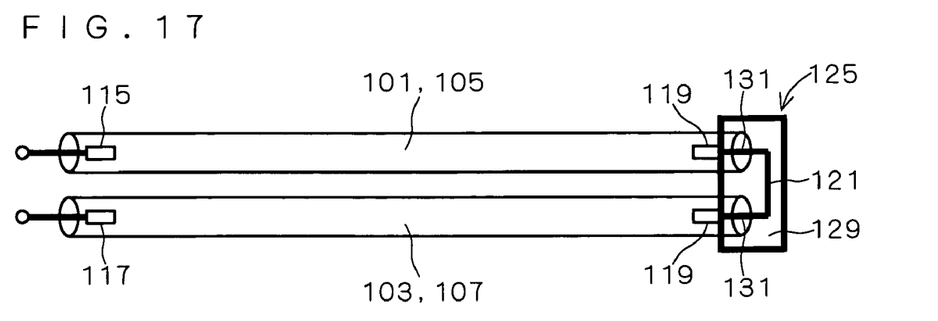
FIG. 17 is a schematic diagram showing linear lamps of a backlight system according to a seventh preferred embodiment of the invention.
Figure 18:
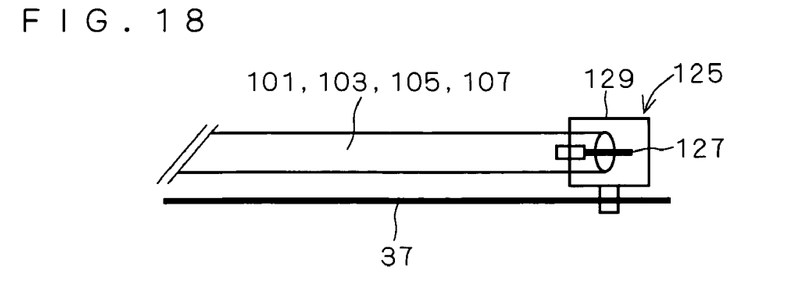
FIG. 18 is a schematic diagram showing a main part of the linear lamp of the backlight system of the seventh preferred embodiment of the invention.

FIGS. 17 and 18 are schematic diagrams showing the backlight system according to a seventh preferred embodiment of the invention. In the seventh preferred embodiment, components having the same functions as those of the sixth preferred embodiment are shown at the same reference numerals. This preferred embodiment, too, illustrates an electronic display device whose display screen is wider than it is high.

The backlight system of this preferred embodiment is similar to that of the sixth preferred embodiment in that a plurality of straight tubes (straight CCFL lamps) 101, 103, 105, 107 are placed in an elongate manner, separated on the left and right in the middle of the display screen, and vertically adjacent straight tubes (101 and 103, 105 and 107) are electrically connected to each other in the middle of the display screen.

However, the seventh preferred embodiment differs from the sixth preferred embodiment in that vertically adjacent straight tubes (101 and 103, 105 and 107) are connected together with socket-type electrical connector parts (lamp holders) 125 in the middle of the display screen.

Electric connector part 125 has a conductive member (e.g. electric wire) 127 provided inside to connect two straight tubes (101 and 103, 105 and 107) and an insulating housing 129 protecting the conductive member 127. It also has socket terminals 131 that are detachably connected to terminals 119 of straight tubes 101, 103, 105, 107.

In other respects the configuration is the same as those of the preferred embodiments described earlier.

With this structure, vertically adjacent straight tubes (101 and 103, 105 and 107) are thus connected through socket-type electric connector parts (lamp holders) 125. The straight tubes (101 and 103, 105 and 107) can thus be electrically connected, and insulation from outside can easily be ensured by the housing 129. Furthermore, advantageously, vertically adjacent straight tubes 101, 103, 105, 107 can be mechanically fixed and supported in the middle of the display screen.

The preferred embodiments have illustrated, as examples, electronic display devices whose display screens are wider than they are high (i.e. the length direction of the display screen corresponds to the horizontal direction). However, needless to say, with electronic display devices whose screens are longer than they are wide (i.e. the length direction of the display screen corresponds to the vertical direction), CCFL lamps 21, 23, 41, 55, 57, 83a, 83b, 101, 103, 105, 107 are arranged in a direction rotated by 90, or the vertical and horizontal relation is reversed.

While the preferred embodiments use CCFL lamps as linear lamps, any linearly formed ones can be used as well as CCFL lamps.

In the preferred embodiments described above, ac voltages in opposite phases are applied to both ends of the U-shaped CCFL lamps 21, 23, 41, 55, 57, 71, 83a, 83b and series-connected straight tubes 101, 103, 105, 107; however, one may be formed as a power-supply hot-side terminal, with the other as a cold-side terminal for grounding. In this case, both terminals of the parallel-arranged plurality of U-shaped CCFL lamps 21, 23, 41, 55, 57, 71, 83a and series-connected straight tubes 101, 103, 105, 107 are arranged so that hot-side terminals and cold-side terminals alternately appear, which alleviates overall temperature difference in end portions of the screen. Also, in FIG. 1, the upper terminals 31a and 31b of U-shaped CCFL lamps 21, 23 can be formed as hot-side terminals and the lower terminals 33a, 33b as cold-side terminals so that hot-side terminals and cold-side terminals are arranged close to each other in the end portions, so as to alleviate overall temperature difference in the end portions.

Alternately arranging hot and cold sides produces brightness difference which appear as bright and dark stripes; however, the brightness difference can be alleviated by adjusting the distance between straight portions of linear lamps and the interval between linear lamps, and also by adjusting the reflectance of reflecting means, diffusivity of diffusing means, or transmittance of light transmission controlling means.

While the invention has been described in detail, the foregoing description is in all aspects illustrative and not restrictive. It is understood that numerous other modifications and variations can be devised without departing from the scope of the invention.

What is claimed is:

1. A backlight system comprising:
a plurality of linear lamps placed behind a liquid-crystal unit along a length direction of a display screen of said liquid-crystal unit, said plurality of linear lamps being divided in the length direction of said display screen approximately in the middle of the length direction and being disposed opposite on both sides in the length direction wherein linear lamps extending from the same side are positioned parallel to one another, and only adjacent linear lamps from the same side form pairs by being electrically connected by a direct serial connection to each other by connectors located approximately in the middle of said display screen.

2. The backlight system according to claim 1, wherein a voltage applied to one of two terminals of each said linear lamp that are placed at an end of said display screen is in a phase opposite to that of an a voltage applied to the other terminal.

3. The backlight system according to claim 1, wherein said connectors are conductive connecting material.

4. The backlight system according to claim 3, wherein said connectors are shielded with isolative material.

5. The backlight system according to claim 1, wherein said linear lamps that are adjacent in the direction vertical to the length direction of said display screen are electrically connected with socket-type electric connector parts placed in the middle of said display screen.

6. The backlight system according to claim 1, wherein said linear lamps are placed in said length direction symmetrically approximately about the middle in the length direction of said display screen.

7. The backlight system according to claim 1, further comprising a pair of power-supply units placed symmetrically, with the middle of said display screen as an axis of symmetry, on said both sides of said display screen, for supplying power to said linear lamps.

* * * * *